United States Patent
Sirkis et al.

[11] Patent Number: 5,841,529
[45] Date of Patent: Nov. 24, 1998

[54] FIBER OPTIC STRAIN SENSOR

[75] Inventors: James S. Sirkis, College Park, Md.; Harmest Singh, Simsbury, Conn.

[73] Assignee: University of Maryland, College Park, Md.

[21] Appl. No.: 824,207

[22] Filed: Mar. 25, 1997

Related U.S. Application Data

[60] Provisional application No. 60/016,294 Mar. 25, 1996.

[51] Int. Cl.⁶ .................................................. G01B 9/02
[52] U.S. Cl. .......................................... 356/345; 356/352
[58] Field of Search ................................. 356/345, 352; 385/12, 14; 250/227.19, 227.27

[56] References Cited

U.S. PATENT DOCUMENTS 4,868,381  9/1989  Davis ........................................ 356/345
5,682,237  10/1997  Belk ........................................ 356/352

*Primary Examiner*—Robert Kim
*Attorney, Agent, or Firm*—Dickstein Shapiro Morin & Oshinsky, LLP

[57] ABSTRACT

An optical fiber device for measuring strain has a first portion which generates a first signal, and a second portion which generates a second signal and is located proximate the first portion. The first and second portions are made of different component types of optical fibers. A fiber carries a superposed signal to readout interferometers which recover individual strain signals from the superposed signal. The individual strain signals are processed to obtain strain measurements in two or more orthogonal directions in the host material. The optical fiber device may also include a third portion which generates a third signal and is located proximate the second portion opposite the first portion.

17 Claims, 2 Drawing Sheets

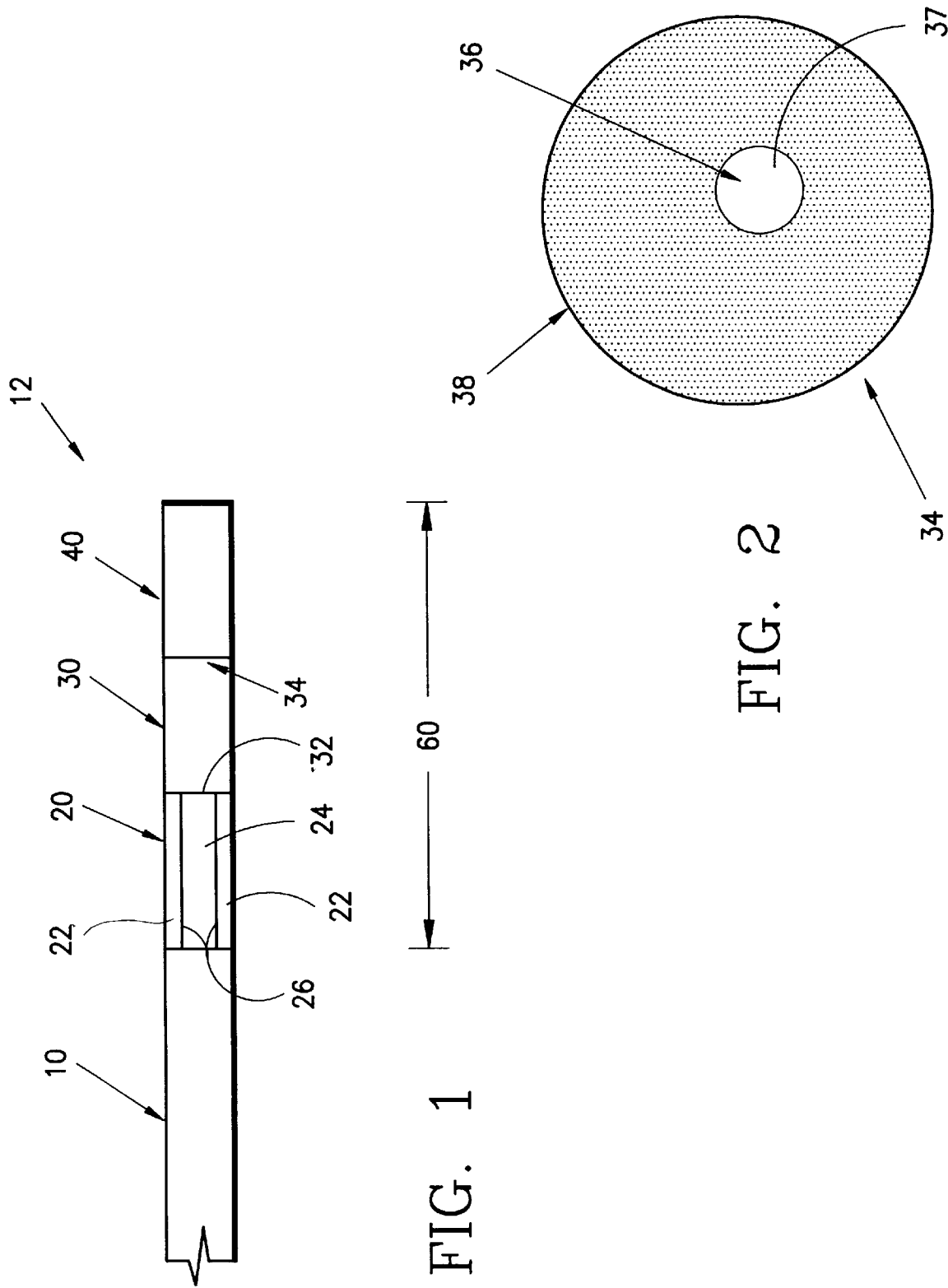

FIBER OPTIC STRAIN SENSOR

BACKGROUND

This application is a provisional application Ser. No. 60/016,294 file Mar. 25, 1996.

The present invention relates to optical fiber sensors, and more specifically, to embedded optical fiber sensors capable of measuring strain in multiple directions.

Optical fiber sensors have been embedded in structures to measure the internal strain state. Many of the sensors are "intrinsic" in nature in that the optical fiber not only guides light to and from the transducer, but also serves as the transducer itself. Optical fiber sensors that fall into this category include Bragg grating, polarimetric, dual-mode, intrinsic Fabry-Perot and other sensors. These sensors are sensitive to all strain components, not just the strain components parallel to the fiber axis. As a result, when these sensors are embedded in a load bearing structure, it is impossible to decouple the contributions of the transverse strains from the contributions of the axial strains. Consequently, high transverse sensitivity errors occur unless the loading in the structures satisfies specific conditions.

Extrinsic Fabry-Perot (EFPI) and In-Line Fiber Eatalon (ILFE) sensors do not experience high transverse sensitivity errors because these sensors are "extrinsic" in nature, which means that the transducer is not fabricated from the optical fiber. In these types of sensors, the transducer is a gap of air formed between the cleaved ends of two fibers. Because EFPI and ILFE sensors are sensitive only along their longitudinal axis, they do not experience transverse sensitivity errors. However, these sensors are capable of measuring only a single strain component.

Many applications in structural systems, particularly for failure analysis, require information about the entire strain state, which includes multiple components of strain. For example, internal strain measurement in composite aircraft skins, thick walled composites used in pressure vessels, composite reinforcing layers added to liquid natural gas tanks, composite reinforcing for concrete structures, rotorcraft, rotorblades and the like all require measurements of strain having two or three orthogonal components.

Although resistance strain gage rosettes can measure multiple strain components, they are difficult to use as embedded sensors. Three-dimensional volumetric optical fiber rosettes similarly can measure multiple components of strain, but the individual gages comprising the rosette would have to be close enough to each other to measure the same strain field, yet not so close so that one sensor disrupts the strain field near the other sensors of the rosette. These difficulties hinder the use of these types of sensors.

Therefore, there is a need in the art for an optical fiber sensor that measures strain in two or three directions, particularly, three strain components, without the need of a rosette configuration, and that is small enough to be embedded within load bearing structures with minimal impact on the local micro-architecture. In addition, because embedded optical fibers disrupt the local strain field to a significant degree, there is a need in the art for a structurally embedded sensing system capable of measuring multiple strain components in a sensor and converting the measured strain to the actual strain in the structure, or host material, itself.

SUMMARY

The present invention alleviates the disadvantages of the prior art by providing a small single transducer element that can measure multiple strain components without the need of a rosette configuration, and that can be embedded within load bearing structures with minimal impact on the local micro-architecture. The sensor device includes more than one portion, each being a Fabry-Perot cavity made of different types of optical fiber than the others, which causes each portion to experience a different phase change in response to loading. The sensor system measures the strain in the sensor based on the phase shifts and accounts for the differences between the strains in the sensor and strain in the host material.

It is an object of the present invention to provide an optical fiber sensor which can measure at least two components of strain in the sensor.

It is another object of the present invention to provide an optical fiber sensor which can measure at least two components of strain in the host material.

It is a further object of the present invention to provide an optical fiber sensor which appears to the naked eye as just another part of the optical fiber lead.

It is yet an additional object of the present invention to provide an optical fiber sensor having cascaded in-line micro Fabry-Perot cavities.

It is a further object of the present invention to provide an optical fiber sensor having cascaded in-line micro Fabry-Perot cavities which are made of different types of optical fibers.

Another object of the invention is to provide a method of measuring strain in a host material in which readout interferometers recover individual signals from a superposed signal, and in which the individual signals are converted to strain measurements.

These and other objects, features and advantages of the present invention will become apparent from the following detailed description and drawings of preferred embodiments of the invention.

BRIEF DESCRIPTION OF THE DRAWINGS

FIG. 1 is a schematic illustration of an optical fiber sensor constructed according to the present invention.

FIG. 2 is a top view of a partially reflecting mirror of the optical fiber sensor of FIG. 1.

DETAILED DESCRIPTION OF PREFERRED EMBODIMENTS

Figures 3, 4:
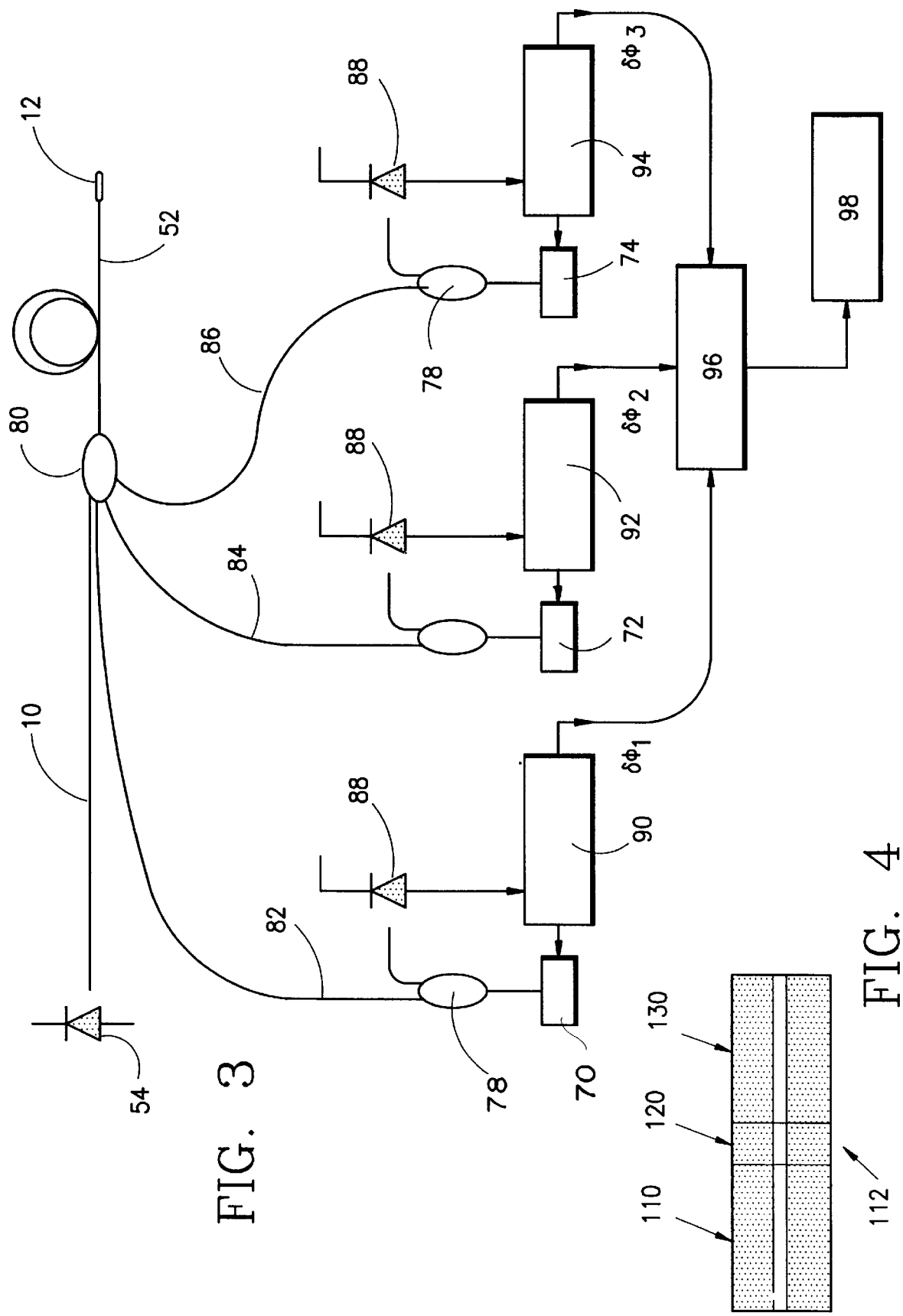
FIG. 3 is a schematic view of a sensing system constructed according to the present invention.
FIG. 4 is a cross sectional view of another optical fiber sensor constructed according to the invention.

Refer now to FIG. 1, there being shown a multiple strain optical fiber sensor 12 constructed according to the present invention. The sensor 12 is shown attached to a single-mode optical fiber 10. The multiple strain sensor 12 has three cascaded in-line micro Fabry-Perot cavities 20, 30, 40. The Fabry-Perot cavities 20, 30, 40 are fabricated from three different types of optical fibers. The hollow core fiber 20, the circular core fiber 30, and the stress-induced elliptical clad high birefringent fiber 40 are the types of fiber used in the Fabry-Perot cavities of FIG. 1. It is possible that the sensors in the circular core fiber 30 and/or the high birefringent fiber 40 could be Bragg gratings instead of Fabry-Perot cavities. In either case, the total length 60 of all three cascaded Fabry-Perot cavities 20, 30, 40 may be less than three millimeters, which causes the sensor 12 to appear to the naked eye as part of the optical fiber lead 10.

The first portion 20 of the sensor 12 is fabricated by fusing a hollow core fiber 24 in-between two segments of standard circular core fiber 22. Air/glass interfaces 26 create the reflective surfaces that form the Fabry-Perot cavity. This configuration is known as an In-Line Fiber Eatalon (ILFE) sensor. Because ILFE sensors are sensitive to only axial strains, when the sensor 12 is subjected to any load, the first portion 20 will generate a signal whose character will vary depending on the amount of strain caused by the load.

The second sensor portion 30 is a standard intrinsic Fabry-Perot (IFP) sensor fabricated from circular core fiber. The air/glass interface 32 and a partially reflecting internal mirror 34 form the cavity in this portion 30. Advantageous results have been found when the mirror 34, shown in FIG. 2, has a thin reflective film 36 deposited on only the core region 37 of the optical fiber 38. This type of mirror 34 enables a strong glass-on-glass fusion splice.

The Smart Material and Structures Research Center has developed a process of making this type of mirror 34, which mitigates the problem of strength degradation caused by traditional internal partial mirrors. Because circular core IFP sensors respond in a highly predictable isotropic manner (see Sirkis, J. S., "Unified Approach to Phase-Strain-Temperature Models for Smart Structure Interferometric Optical Fiber Sensors: Parts I, Applications," Optical Engineering, Vol. 32, pg. 752–761, April 1993, the entire disclosure of which is incorporated herein by reference), when the second portion 30 is subjected to a load having transverse components, it will generate a known signal whose character will vary depending on the amount of strain in the axial as well as transverse directions caused by the load.

The third sensor portion 40 is fabricated from elliptical clad high birefringent (HiBi) optical fiber. This type of fiber is a stress-induced HiBi intrinsic Fabry-Perot fiber (HiBi IFP) that has an anisotropic residual stress state manufactured into it. Because stress-induced HiBi IFP fibers respond to strain fields in an orthotropic manner that differs from both ILFE and circular core fiber (see Sirkis, J. S., "Unified Approach to Phase-Strain-Temperature Models for Smart Structure Interferometric Optical Fiber Sensors: Part II, Development," Optical Engineering, Vol. 32, pg. 762–773, April 1993, and Lo, Y. L., Sirkis, J. S., and Ritchie, K. T., "A Study of the Optomechanical Response of a Diametrically Loaded High Birefringent Optical Fiber," Journal of Smart Structures and Materials, Vol. 4, pp. 327–333, 1995 the entire disclosures of which are incorporated herein by reference), when the third portion 40 is subjected to a load having transverse components, it will generate a known signal whose character will vary depending on the amount of strain in the axial as well as transverse directions caused by the load.

Because there is a relation between externally applied strain and the behavior of optical fibers, optical fiber sensors may be used to measure the strain in a host material. Specifically, the refractive index of an optical material changes when strain is applied to the optical material, and the functional relationship between the refractive index and strain includes all strain components. Because each portion 20, 30, 40 of the three-parameter multiple strain sensor 12 of FIG. 1 is fabricated from different types optical fiber, each of the Fabry-Perot cavity portions 20, 30, 40 responds differently to applied strain fields or loads. By individually accessing the signals from the three portions 20, 30, 40 through multiplexing techniques, a sensing system can determine three independent equations for three orthogonal strain components, which correspond to an axial strain, a first transverse strain, and a second transverse strain, respectively.

In some important applications, the loading is such that the first and second transverse strain components are identical. In these applications, it may not be necessary to measure strain in more than two orthogonal directions (one axial and one transverse). An optical fiber sensor that is capable of sensing only two strain components is appropriate for these applications.

FIG. 4 shows a two-parameter multiple strain optical fiber sensor 112 according to the present invention attached to a lead-in fiber 110. This sensor 112 has only two Fabry-Perot cavities 120, 130. The first portion 120 is a hollow core fiber like the ILFE of the previous embodiment, which responds to only axial strains. The second portion 130 is a circular core fiber, such as a Lo-Bi circular core fiber or the IFP of the previous embodiment. This configuration produces an acceptable two-parameter sensor 112 because the ILFE first portion 120 and the circular core second portion 130 respond differently in orthogonal directions to strain fields produced by loads.

Refer now to FIG. 3, which shows a sensing system 50 according to the present invention, which reads the signal 52 from the three-parameter multiple strain optical fiber sensor 12 and converts this data into strain information.

The portions 20, 30, 40 of the sensor 12 generate a first signal, a second signal, and a third signal, respectively. The three signals are normally superposed into a superposed signal 52 because they are transmitted through a single fiber 10. The three Fabry-Perot cavities 20, 30, 40 are individually addressed using coherence division multiplexing, such as a coherence based demultiplexing scheme known as path matched differential interferometry (PMDI). In coherence-based demultiplexing, the sensor system is constructed using a broad band source 54, which has a coherence length smaller than the optical path length of each sensor component 20, 30, 40. This type of arrangement leads to interference only if another interferometer (a readout interferometer 70, 72, 74), whose path length is the same as that of the sensing element 20, 30, 40, is cascaded to the sensing system 50.

This feature allows easy multiplexing where the superposed signal 52 coming out of the sensor 12 is divided by a coupler 80 into three divided signals 82, 84, 86 and is cascaded with three readout interferometers 70, 72, 74. By adjusting the three readout interferometers 70, 72, 74 to each of the respective three portions or sensing elements 20, 30, 40 of the sensor 12, the phase of each of the first, second, and third signals can be measured by counting fringes or using demodulating schemes.

For example, in FIG. 3, the demodulating scheme includes first, second, and third demodulators 90, 92, 94, which are the signal processors that convert the optical intensities from the sensor to voltages that are proportional to the optical phase changes. Photodetectors 88 and couplers 78 are used with the detectors 90, 92, 94 and readout interferometers 70, 72, 74. When used with a two-parameter multiple strain sensor, the sensing system requires only two demodulators 90, 92.

Once the demodulators 90, 92, 94 measure the phase change of each of the first, second, and third signals, it is possible to determine the strain in the optical fiber sensor 12 because the refractive index in optical materials changes when strain is applied, and the functional relationship between the refractive index and strain includes all strain components. The relationship between the strain state in many popular optical fiber sensor configurations and the respective phase shifts is disclosed in Sirkis, J. S., "Unified Approach to Phase-Strain-Temperature Models for Smart Structure Interferometric Optical Fiber Sensors: Parts I & II, Development," Optical Engineering, Vol. 32, pg. 752–773, April 1993. Equations demonstrating these relationships are called phase strain models.

The phase strain model for the first portion 20 of the three-parameter multiple strain sensor 12 made of an ILFE sensor is:

$$\Delta\phi_1 = 2\beta_\alpha L \epsilon_1^f \quad (1)$$

The phase strain model for the second portion 30 of the three-parameter multiple strain sensor 12 made of a circular core IFP sensor is:

$$\Delta\phi_2 = 2\beta_0 L_2[(1-\tfrac{1}{2}n_0^2 P_{12})\epsilon_1^f - \tfrac{1}{4}n_0^2(P_{11}+P_{12})\epsilon_2^f - \tfrac{1}{4}n_0^2(P_{11}+P_{12})\epsilon_3^f] \quad (2)$$

In equations (1) and (2), $\Delta\phi_1$ and $\Delta\phi_2$ respectively refer to the strain-induced phase-changes in the ILFE and circular core IFP, $P_{ij}$ are the Pockel's strain-optic constants for the fiber, ($\epsilon_1^f$, $\epsilon_2^f$, $\epsilon_3^f$) are respectively the axial and two transverse strain components in the fiber, $\beta_a$ and $\beta_0$ are respectively the propagation constants for air and for the glass from which the fiber is made.

Equations (1) and (2) can be simplified to $$\Delta\phi_1 = K_{11}\epsilon_1^f \quad (3)$$

for the ILFE and $$\Delta\phi_2 = K_{21}\epsilon_1^f + K_{22}\epsilon_2^f + K_{23}\epsilon_3^f \quad (4)$$

for the IFP sensor, where the effective strain-optic constants K for each sensor can be determined by inspection from Equations (1) and (2). As can be seen from Equation (2), for circular core fiber, $K_{22}$ and $K_{23}$ are equal to one another.

The phase-strain model for the third portion 40 of the three-parameter multiple strain sensor 12, which is fabricated from the stress-induced elliptical core fiber, is found through the fictitious residual strain approach augmented with experimental calibration procedures. (See Sirkis, J. S., Lo, Y. L., and Nielsen, P. L., "Phase-Strain Model for Polarimetric Strain Sensors Based on Fictitious Residual Strains, "Journal of Intelligent Material Systems and Structures," 5 (2), pp. 494–500, 1994; and Lo, Y. L., and Sirkis, J. S., "Simultaneous Measurements of Two Strain Components Using 2×2 and 3×3 Passive Michelson Interfero-Polarimetric Sensors," Journal of Lightwave Technology, 1995, both of which are incorporated herein by reference.) This approach has been applied successfully for stress-induced Bow-Tie HiBi and geometry induced elliptical core fiber.

This approach yields a phase-strain model that looks much like the one in Equation (4) with the exception that there are now three independent effect strain-optic constants:

$$\Delta\phi_3 = K_{31}\epsilon_1^f + K_{32}\epsilon_2^f + K_{33}\epsilon_3^f \quad (5)$$

Equations (3) through (5) can be combined to form the system of equations for the unknown strains in the fiber in terms of the measured phase-change in the respective Fabry-Perot cavity portions 20, 30, 40 of the sensor 12:

$$\begin{bmatrix} \Delta\phi_1 \\ \Delta\phi_2 \\ \Delta\phi_3 \end{bmatrix} = \begin{bmatrix} K_{11} & 0 & 0 \\ K_{21} & K_{22} & K_{23} \\ K_{31} & K_{32} & K_{33} \end{bmatrix} \begin{bmatrix} \epsilon_1^f \\ \epsilon_2^f \\ \epsilon_3^f \end{bmatrix}. \quad (6)$$

The condition number of this system of equations was determined to be on the order of $10^6$, which indicates that the solution for the strain in the fiber will have excellent numerical stability. As a result, errors in measuring the phase changes are not magnified or compounded by application of Equation (6).

If a two-parameter multiple strain sensor 112 is used, for example in applications in which the first transverse strain is identical to the second transverse strain, then the equations depend on the types of optical fiber used for the first and second portions 120, 130 of the sensor 112. If the first portion 120 is an ILFE and the second portion 130 is a Lo-Bi circular core fiber, the equations for this type of system are identical to the ones derived for the three parameter system, except that only the equations for the ILFE and IFP in Equation (6) are used. The phase change in terms of the strain can be expressed as:

$$\begin{bmatrix} \Delta\phi_1 \\ \Delta\phi_2 \end{bmatrix} = \begin{bmatrix} K_{11} & 0 \\ K_{21} & K_{22}+K_{23} \end{bmatrix} \begin{bmatrix} \epsilon_1^f \\ \epsilon_2^f \end{bmatrix} \quad (7)$$

where $\Delta\phi_1$ and $\Delta\phi_2$ are said first phase change and said second phase change, respectively;

$\epsilon_1^f$ and $\epsilon_2^f$ are said first strain and said second strain, respectively; and $K_{11}$, $K_{21}$, $K_{22}$, and $K_{23}$ are effective strain-optic constants. Because $K_{22}=K_{23}$, $K_{22}+K_{23}=2K_{22}$.

A secondary converter 96, such as a programmed microprocessor, database, computer, or other programmable device, reads the phase change information from the demodulators 90, 92, 94 and processes the information in accordance with Equations (6) or (7), depending on whether a two-parameter or three parameter multiple strain sensor is used, to determine strain values. For the three-parameter multiple strain sensor, the strain values correspond to axial strain, first transverse strain, and second transverse strain. For the two-parameter multiple strain sensor, the strain values correspond to axial strain and transverse strain.

In operation, therefore, the three-parameter multiple strain sensor 12 is placed in a sensing system 50 connected to a single-mode lead-in fiber 10. When a load creates a strain field, the first portion 20 generates a first signal, the second portion 30 generates a second signal, and the third portion 40 generates a third signal, all of which are superposed and carried by the lead-in fiber 10. A coupler 80 divides the superposed signal into a first divided signal 82, a second divided signal 84, and a third divided signal 86. A first readout interferometer 70 recovers the first signal from the first divided signal 82 while a second readout interferometer 72 recovers the second signal from the second divided signal 84 and a third readout interferometer 76 recovers the third signal from the third divided signal 86.

Then, a first demodulator 90 reads the first signal from the first readout interferometer 70 and determines the phase change of the first signal while a second demodulator 92 reads the second signal from the second readout interferometer 72 and determines the phase change of the second signal and a third demodulator 94 reads the third signal from the third readout interferometer 74 and determines the phase change of the third signal.

A secondary converter 96 then determines a first strain, a second strain, and a third strain from the respective phase shifts by applying Equations (6) or (7), depending on whether the sensor is a two- or three-parameter multiple strain sensor.

The last step for measuring strain in a host material is to relate the strains measured in the sensor 12, 112 to the strains in the host material (not illustrated). Because embedded optical fibers disrupt the local strain field to a significant degree, the strain state in the fiber is not the same as the strain state generated in an identical host composite with no embedded optical fiber. Closed form or numerical analysis, referred to as an inversion process, can be used to express the composite strain field in terms of the optical fiber strain field.

This inversion process has been successfully implemented for isotropic host materials using simplifications of the generalized plane strain solutions. (See Sirkis, J. S., and Mathews, C. T., "Experimental Verification of Phase-Strain Temperature Models For Structurally Embedded Interferometric Fiber Optic Sensors," Experimental Mechanics, pp. 26–31, 1993; and Liu, K. and Measures, R. M., "Strain Transfer and Complete Strain State Measurement with Embedded Fiber-Optics Sensors," Journal of Smart Materials and Structures, 2 (2), pp. 66–70, June, 1993, both of which are incorporated herein by reference.)

An inversion process has also been implemented for locally transversely isotropic host composite materials. (See Sirkis, J. S., "Unified Approach to Phase-Strain-Temperature Models for Smart Structure Interferometric Optical Fiber Sensors: Part II, Development," Optical Engineering, Vol. 32, pg. 762–773, April 1993.) By applying these models, a tertiary converter 98, which may be a programmed microprocessor, a database, computer, or other programmable device, relates the phase shifts in the sensor 12, 112 to the principal strains in the host material.

The above description and drawings are only illustrative of preferred embodiments of the present invention. Any modification of the illustrated embodiments which comes within the spirit and scope of the following claims is to be considered part of the present invention.

The entire disclosure of U.S. Provisional Application Ser. No. 60/016,294, filed Mar. 25, 1996, is expressly incorporated herein by reference.

What is claimed as new and desired to be protected by Letters Patent of the United States is:

1. An optical fiber sensor device for measuring strain, comprising:
    a first portion which generates a first signal;
    a second portion which generates a second signal and is located proximate said first portion; and
    a third portion which generates a third signal and is located proximate said second portion opposite said first portion;
    wherein said first portion is made of a first type of optical fiber, said second portion is made of a second type of optical fiber that differs from said first type, and wherein said third portion is made of a third type of optical fiber that differs from both said first and second types.

2. The sensor device of claim 1, wherein said third portion includes an intrinsic sensor.

3. The sensor device of claim 1, wherein said third portion includes a Fabry-Perot cavity.

4. The sensor device of claim 1, wherein said third portion includes a Bragg grating sensor.

5. The sensor device of claim 1, wherein said third portion includes a stressed-induced elliptical clad high birefringent fiber.

6. The sensor device of claim 1, wherein said third signal corresponds to a second transverse strain.

7. The sensor device of claim 1, wherein said first, second, and third portions generate respectively first, second and third signals representative of three independent strain components of the measured strain.

8. A sensing system for measuring strain in a host material, said sensing system comprising:
    a sensor device including a first portion which generates a first signal, a second portion which generates a second signal and is located proximate said first portion, and a third portion which generates a third signal and is located proximate said second portion, wherein said first portion is made of a first type of optical fiber, said second portion is made of a second type of optical fiber that differs from said first type, and said third portion is made of a third type of optical fiber that differs from both said first and second types;
    a fiber which carries a superposed signal which includes said first, second, and third signals;
    first, second, and third readout interferometers which recover said first, second, and third signals from said superposed signal;
    a demodulator system which reads said first, second, and third signals from said first, second, and third readout interferometers and determines a first phase change based on said first signal, a second phase change based on said second signal, and a third phase change based on said third signal; and
    a converter which determines a first strain based on said first phase change, a second strain based on said second phase change, and a third strain based on said third phase change.

9. The sensing system of claim 8, further comprising a coupler which divides said superposed signal into a first divided signal and a second divided signal.

10. The sensing system of claim 8, wherein said first readout interferometer is arranged to recover said first signal from said first divided signal, and said second readout interferometer is arranged to recover said second signal from said second divided signal.

11. The sensing system of claim 8, further comprising a conversion device which reads said first strain and said second strain and determines a first host strain in said host material based on said first strain and a second host strain in said host material based on said second strain, wherein said first host strain corresponds to an axial strain in a host material in which said sensor is embedded, and said second host strain corresponds to a transverse strain in said host material.

12. The sensing system of claim 11, wherein said conversion device is a programmable device that performs an inversion process on said first and second strains to determine the first and second host strains, respectively.

13. The sensing system of claim 8, wherein said first, second and third portions generate respectively first, second and third signals representative of three independent strain components of the host material.

14. A method of measuring strain in a host material, said method comprising the steps of:
    transmitting a superposed signal from an embedded optical fiber sensor device;
    dividing said superposed signal into a first divided signal, a second divided signal, and a third divided signal;
    recovering a first strain signal from said first divided signal;

recovering a second strain signal from said second divided signal;

recovering a third strain signal from said third divided signal; and determining a first strain based on said first strain signal, a second strain based on said second strain signal recovering a third strain signal from said third divided signal; and, a third strain based on said third strain signal, wherein each of said first, second and third strain signals are independent of each other and respectively represent three independent strain components of the host material wherein the optical fiber sensor device is composed of first, second and third portions, wherein said first portion is made of a first type of optical fiber, said second portion is made of a second type of optical fiber that differs from said first portion, and said third portion is made of a third type of optical fiber that differs from both said first and second types.

15. The method of claim 14, further comprising the step of determining a first host strain based on said first strain and a second host strain based on said second strain.

16. The method of claim 14, further comprising the step of determining a first host strain based on said first strain, a second host strain based on said second strain, and a third host strain based on said third strain.

17. The method of claim 16, wherein said step of determining is performed using an inversion process on said first and second strains to determine the first and second host strains, respectively.

* * * * *